Patented Oct. 5, 1954

2,691,042

UNITED STATES PATENT OFFICE 2,691,042

MANUFACTURE OF TRI-(DIALKYLAMINO-ALKOXY) BENZENE

Richard Joseph Turner, Fanwood, and Jerome J. Lawson, Gladstone, N. J., assignors to American Cyanamid Company, New York, N. Y., a corporation of Maine No Drawing. Application November 17, 1951, Serial No. 256,967

11 Claims. (Cl. 260—570.7)

This invention relates to the purification of tri-(dialkylaminoalkoxy) benzenes and particularly with the purification of 1,2,3-tri-(beta-diethylaminoethoxy) benzene.

Tri-(dialkylaminoalkoxy) benzenes have been prepared by reacting 2-chlorotriethylamine with the alkali metal salts of tri-hydroxybenzenes such as trisodium pyrogallate in aqueous solution. The tri-(dialkylaminoalkoxy) benzenes are oils which are normally purified by distillation. The quaternary salts of these compounds, for example the triethiodide, are therapeutically useful as muscle relaxants.

As in the case of most pharmaceuticals a very high degree of purity is necessary. Unfortunately, however, purification of the tertiary bases by distillation did not produce sufficiently pure products, and when they were quaternized impure products were produced in low yield. These required further purification with resulting loss in yield in order to produce compounds of purity sufficient for medical use. Thus, for example, when the crude 1,2,3-tri-(beta-diethylaminoethoxy) benzene is subjected to the ordinary fractional distillation a product is obtained boiling over at a wide range. When this is then quaternarized with ethyl iodide a relatively low yield of impure product is obtained which requires purification by recrystallization, for example, from alcohol with a resulting further loss in yield usually amounting to around 10%. Apparently impurities are produced in the first step which cannot be satisfactorily separated by ordinary fractional distillation. Some of these impurities appear to be incompletely etherified products containing free phenolic groups. These incompletely etherified products do not dissolve in the aqueous alkali in the original reaction mixture and so appear with the distilled product, with which they codistill. It is possible that there are also other by-products which boil near to that of the desired main product.

According to the present invention, it has been found that if the distillation is effected in the presence of a small amount of a strong solid alkali the impurities are transformed into non-volatile products such as salts, and do not distill over. As a result, a relatively pure, completely etherified product is obtained which upon subsequent quaternization results in higher yields of the quaternary compounds that are chemically pure. The present invention, therefore, eliminates the purification of the final quaternary salts without eliminating the function of the step and produces chemically pure products in higher yield at lower cost.

The nature of the strong alkali is critical, and there can be used solid alkali metal hydroxides such as sodium hydroxide and potassium hydroxide and alkali metal alcoholates such as sodium and potassium methylates and ethylates. Weaker alkalies such as sodium carbonate do not perform any useful result and so in the present specification and claims the term "strong alkali" will be restricted to alkalies having greater strength than carbonates. It is also necessary that the alkali be a fixed alkali so that it will not be distilled off. On the other hand, the amount of strong alkali used is not so critical so long as it is sufficient to react with the phenolic impurities present. In general, this amount will be small and will usually not exceed half a mol based on the original pyrogallol used. This limit is in no sense critical as more of the solid strong alkali can be used, but larger amounts do not give improved results which would warrant their additional cost.

The improved purity and yield of the final quaternary salt is not limited to the triethiodides, though as this product is the one that is of immediate commercial importance, it is, of course, of maximum importance. The fact that improved results with other quaternary salts is obtainable is not surprising because the novel step represented by the present invention is involved in the purification of the tertiary base, the quaternizing reaction is the same, and a base of higher purity gives a pure quaternary salt regardless of whether it is ethyl iodide, ethyl bromide, or chloride or other alkyl iodide.

Because of the practical importance of the quaternary salts of 1,2,3-tri-(beta-diethylaminoethoxy) benzene this is the preferred modification of the invention. However, similarly improved results are obtained with other dialkylaminoalkyl ethers of benzene such as a gamma-dipropylaminopropyl, beta dipropylaminoethyl, etc., and the invention in its broader aspects is not limited to beta-diethylaminoethyl ethers. It is essential that the strong base be solid as the use of aqueous alkali does not perform the useful results. The reaction of the added strong solid alkali is essentially a fusion reaction because the temperature is above the melting points of the impurities. It is not known why the presence of a considerable amount of water prevents the improved results and it is not intended to limit the invention to any theory of why the strong base must be present in solid form.

The invention will be described in greater detail in conjunction with the following specific examples, which are typical embodiments of the

Example 1

To one mol. of pyrogallol under toluene is added 3.1 mols of sodium hydroxide in the form of a 30% solution. The mixture is stirred and heated to refluxing temperature and solutions of 3.5 mols of 2-chlorotriethylamine and 3.8 mols of sodium hydroxide (as 30% solution) are simultaneously but gradually added and heating continued until reaction is complete. The mixture separates into a toluene layer and an aqueous layer; the fractions are separated and the toluene fraction washed with a 30% aqueous sodium hydroxide solution and then with water, whereupon the toluene is distilled off, leaving an oily residue. To this residue there is added 0.16 mol of sodium hydroxide and fractional distillation is effected at 1.5 mm. pressure. The 1,2,3-tri-(beta-diethylaminoethoxy) benzene distills off at 186–194° C., approximately $\frac{6}{10}$ of a mol being recovered. When 0.071 mol of the distilled material is refluxed with 0.285 mol of ethyliodide in 215 parts of acetone until quaternization is complete, the reaction mixture is then cooled, filtered, washed and dried to 0.061 mol of white crystalline 1,2,3-tri-(beta-diethylaminoethoxy) benzene triethiodide in a chemically pure state.

When the above procedure is repeated without the addition of the solid sodium hydroxide, a fraction distilling from 180–210° C. is obtained which is impure and when subjected to the quaternization with ethyl iodide as described above results in only 0.054 mol of product, from 0.071 mol of crude. The yield is thus about 13% lower than from the above procedure, and the product is too impure for therapeutic use, requiring purification by recrystallization which results in a further 10% loss.

When an amount of sodium carbonate equivalent to the sodium hydroxide is used, the purity of the distillate is slightly improved, but the yield on quaternization is the same as if no alkali were present during distillation and the final product requires purification by recrystallization in order to obtain a product pure enough for therapeutic use.

Example 2

The procedure of Example 1 is followed but 0.48 mols of sodium hydroxide are used instead of 0.16. The resulting base is purer and on quaternization yields a fractionally higher yield of chemically pure material.

Example 3

The procedure of Example 1 is followed, replacing the sodium hydroxide with 0.2 mol of potassium hydroxide. The product is obtained in slightly higher yield with a boiling point range of 193–196° C. and on quaternization produces 0.64 mol of chemically pure product as against 0.61 when sodium hydroxide is used in Example 1.

Example 4

The procedure of Example 1 is followed replacing the 0.16 mol of sodium hydroxide with 0.23 mol of sodium methylate. The yield of distillate is slightly lower but it is of excellent grade, 0.65 mol of chemically pure quaternary salt being obtained from 0.71 mol of distillate.

We claim:

1. A process of purifying a tri-(dialkylaminoalkoxy) benzene which comprises subjecting the product to fractional distillation under reduced pressure in the presence of a solid alkali selected from the group consisting of alkali metal hydroxides and alkali metal alcoholates.

2. A process according to claim 1 in which the tri-(dialkylaminoalkoxy) benzene is a tri-(beta-diethylaminoethoxy) benzene.

3. A process according to claim 2 in which the solid alkali is sodium hydroxide.

4. A process according to claim 1 in which the solid alkali is sodium hydroxide.

5. A process according to claim 1 in which the tri-(dialkylaminoalkoxy) benzene is tri-(beta-diethylaminoethoxy) benzene and the solid alkali is potassium hydroxide.

6. A process according to claim 1 in which the tri-(dialkylaminoalkoxy) benzene is tri-(beta-diethylaminoethoxy) benzene and the solid alkali is sodium methylate.

7. A process of producing chemically pure tri-(dialkylaminoalkoxy) benzene which comprises reacting the corresponding tri-hydroxybenzene with a monohalogen substituted tri-alkylamine in the presence of a strong alkali, isolating the crude tri-(dialkylaminoalkoxy) benzene and subjecting it to fractional distillation in the presence of a solid alkali selected from the group consisting of alkali metal hydroxides, and alkali metal alcoholates.

8. A process according to claim 7 in which the tri-(dialkylaminoalkoxy) benzene is tri-(beta-diethylaminoethoxy) benzene.

9. A process according to claim 8 in which the solid alkali is sodium hydroxide.

10. A process according to claim 8 in which the solid alkali is potassium hydroxide.

11. A process according to claim 8 in which the solid alkali is sodium methylate.

References Cited in the file of this patent

UNITED STATES PATENTS

| Number | Name | Date |
| --- | --- | --- |
| 2,052,743 | Bibb | Sept. 6, 1936 |
| 2,199,995 | Hickman | May 7, 1940 |
| 2,458,049 | Bloch | Jan. 4, 1949 |
| 2,544,076 | Fourneau | Mar. 6, 1951 |